US012583359B2

(12) United States Patent (10) Patent No.: US 12,583,359 B2

Nagata et al. (45) Date of Patent: Mar. 24, 2026

(54) INFORMATION PROCESSING APPARATUS, AND INFORMATION PROCESSING METHOD

(71) Applicant: TOYOTA JIDOSHA KABUSHIKI KAISHA, Toyota (JP)

(72) Inventors: Yu Nagata, Chofu (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 964 days.

(21) Appl. No.: 17/745,073

(22) Filed: May 16, 2022

(65) Prior Publication Data

US 2022/0396174 A1     Dec. 15, 2022

(30) Foreign Application Priority Data

Jun. 9, 2021     (JP) ................................. 2021-096924

(51) Int. Cl.
| | |
|---|---|
| *B60L 58/14* | (2019.01) |
| *B60L 1/00* | (2006.01) |
| *B60L 3/00* | (2019.01) |
| *B60L 58/10* | (2019.01) |
| *B60L 58/13* | (2019.01) |
| *B60L 58/15* | (2019.01) |
| *G06Q 50/06* | (2024.01) |
| *G06Q 50/26* | (2024.01) |
| *H02J 7/00* | (2006.01) |

(52) U.S. Cl.
CPC .............. *B60L 58/14* (2019.02); *B60L 58/10* (2019.02); *B60L 58/13* (2019.02); *B60L 58/15* (2019.02); *G06Q 50/06* (2013.01); *G06Q*

*50/265* (2013.01); *H02J 7/0063* (2013.01); *B60L 1/006* (2013.01); *B60L 3/00* (2013.01); *B60L 2240/62* (2013.01); *B60L 2240/70* (2013.01)

(58) Field of Classification Search
CPC .......... B60L 58/14; B60L 58/10; B60L 58/13; B60L 58/15; B60L 1/006; B60L 3/00; B60L 2240/62; B60L 2240/70; G06Q 50/06; G06Q 50/265; H02J 7/0063
USPC ......................................................... 320/134
See application file for complete search history.

(56) References Cited

U.S. PATENT DOCUMENTS

| | | | |
|---|---|---|---|
| 6,075,346 A | 6/2000 | Kikuchi et al. | |
| 9,007,023 B2 * | 4/2015 | Dao ...................... | H02J 7/0013 |
| | | | 320/111 |
| 2015/0046003 A1 | 2/2015 | Doi | |
| 2018/0154778 A1 * | 6/2018 | Ota ........................ | H02J 7/0068 |
| 2019/0369623 A1 * | 12/2019 | Sadakiyo ................ | H04W 4/90 |
| 2021/0057927 A1 * | 2/2021 | Kazuno ................... | H02J 9/002 |

FOREIGN PATENT DOCUMENTS

| | | |
|---|---|---|
| JP | 11-187577 A | 7/1999 |
| JP | 2015-35841 A | 2/2015 |
| JP | 2018-93604 A | 6/2018 |
| JP | 2019-206300 A | 12/2019 |
| JP | 2020-114051 A | 7/2020 |
| JP | 2021-35088 A | 3/2021 |

* cited by examiner

*Primary Examiner* — Julian D Huffman
*Assistant Examiner* — Nathan J Instone
(74) *Attorney, Agent, or Firm* — Sughrue Mion, PLLC

(57) ABSTRACT

An upper limit value of discharging power of a battery mounted on a moving object is made larger when a predetermined event has occurred than when it has not occurred.

12 Claims, 8 Drawing Sheets

SERVER

30

1

N1

10

18

VEHICLE

| VEHICLE ID | CURRENT LOCATION | EVENT TYPE | EVENT POSITION |
|:---:|:---:|:---:|:---:|
| x x x | x x x | x x x | x x x |
| x x x | x x x | x x x | x x x |
| x x x | x x x | — | — |
| . . . | . . . | . . . | . . . |

Fig. 4

INFORMATION PROCESSING APPARATUS, AND INFORMATION PROCESSING METHOD

CROSS REFERENCE TO THE RELATED APPLICATION

This application claims the benefit of Japanese Patent Application No. 2021-096924, filed on Jun. 9, 2021, which is hereby incorporated by reference herein in its entirety.

BACKGROUND

Technical Field

The present disclosure relates to an information processing apparatus, an information processing method, and a moving object.

Description of the Related Art

There is known a technique in which a charging power upper limit value and a discharging power upper limit value of a battery are determined according to a temperature thereof, and charging power is controlled so as not to exceed the upper limit values (for example, refer to Patent Literature 1).

CITATION LIST

Patent Literature

Patent Literature 1: Japanese Patent Application Laid-Open Publication No. H11-187577

SUMMARY

Normally, electric power is controlled in consideration of the deterioration of the battery, but in some situations, a large amount of electric power may be required. An object of the present disclosure is to provide a technique capable of more appropriately utilizing a battery.

One aspect of the present disclosure is directed to an information processing apparatus including a controller configured to perform:

generating a command to make an upper limit value of discharging power of a battery mounted on a moving object larger when a predetermined event has occurred than when it has not occurred.

Another aspect of the present disclosure is directed to an information processing method for causing a computer to perform:

obtaining that a predetermined event has occurred; and generating a command to make an upper limit value of discharging power of a battery mounted on a moving object larger when the predetermined event has occurred than when it has not occurred.

A further aspect of the present disclosure is directed to a moving object including a controller configured to perform:

making an upper limit value of discharging power of a mounted battery larger when a predetermined event has occurred than when it has not occurred.

In addition, a still further aspect of the present disclosure is directed to a program for causing a computer to perform processing in the above-mentioned information processing apparatus, or a storage medium storing this program in a non-transitory manner. Moreover, a yet further aspect of the present disclosure is an information processing method in which a computer performs processing in the above-mentioned moving object, or a program for causing a computer to perform the processing in the above-mentioned moving object, or a storage medium storing this program in a non-transitory manner.

According to the present disclosure, a battery can be utilized more appropriately.

BRIEF DESCRIPTION OF THE DRAWINGS

FIG. 4 is a view illustrating an example of a table configuration of a vehicle information DB;

DESCRIPTION OF THE EMBODIMENTS

Figure 1:
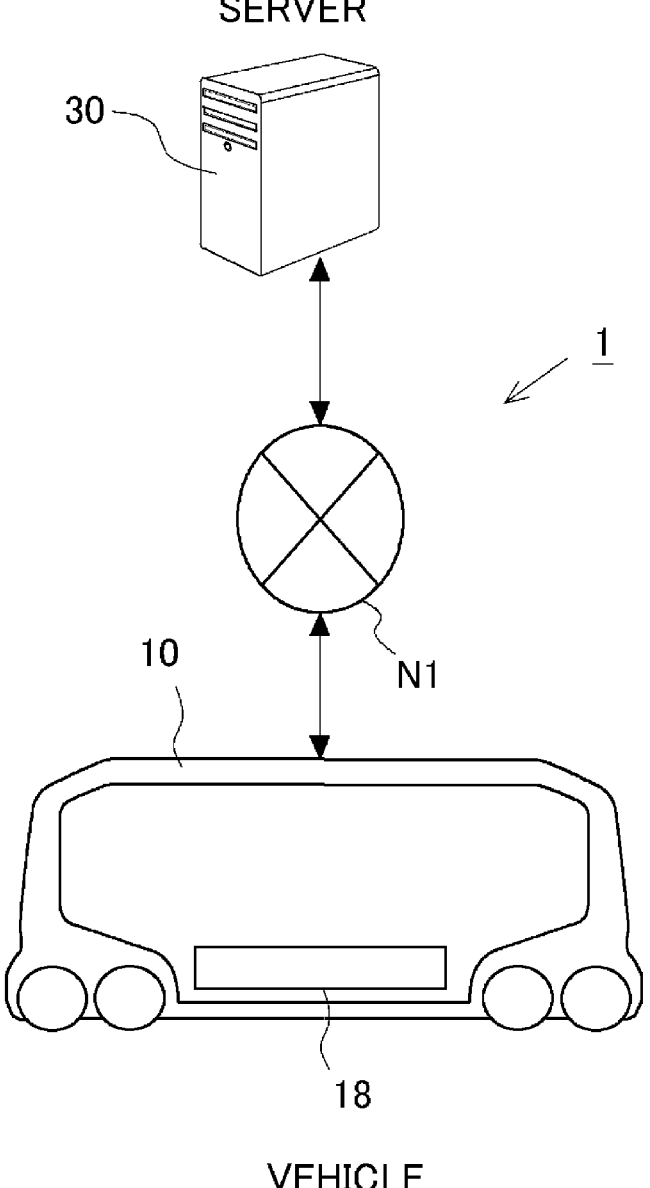
FIG. 1 is a view illustrating a schematic configuration of a system according to an embodiment.

An information processing apparatus, which is one aspect of the present disclosure, includes a controller. The controller performs generating a command to make an upper limit value of discharging power of a battery mounted on a moving object larger when a predetermined event has occurred than when it has not occurred. The moving object is, for example, a vehicle. The moving object may move autonomously, or may move by being driven by a driver or an operator. The moving object may be a hybrid vehicle or an electric automobile. The moving object is provided with a battery. This battery is capable of supplying electric power to devices or the like outside the moving object. For example, the battery of the moving object can be used to charge a user's smartphone or the like.

The predetermined event is one in which the power supply from the battery may increase. For example, in cases where a disaster occurs and power transmission lines, sub-stations or the like are damaged, it may be difficult to supply electric power to users. Also, for example, in cases where a performance is held outdoors, it can be considered that facilities for supplying electric power are not in place. In the above cases, electric power can be supplied from the battery of the moving object to the devices or the like of the users.

Here, when the battery is charged or discharged, charging or discharging power may be limited. In other words, as the charging or discharging power becomes larger, the life of the battery becomes shorter, and hence, an upper limit is set on the charging or discharging power, so that the life of the battery is prevented from becoming shorter. On the other hand, the larger the charging power is, the faster the battery can be charged. In addition, the larger the discharging power is, electric power can be supplied to more external devices.

Therefore, if the discharging power is limited in an attempt to extend the life of the battery as described above, for example, the number of devices that can be powered by the battery at the same time will be decreased. Therefore, when the predetermined event occurs, there will be a possibility of causing power shortage. Similarly, if the charging power is limited in an attempt to extend the life of the battery, for example, it will take time to charge the battery, and hence it will take time until electric power can be supplied to external devices.

Therefore, the controller generates a command to make the upper limit value of the discharging power of the battery mounted on the moving object larger when the predetermined event has occurred than when it has not occurred. Thus, it is possible to cope with an increase in the demand for electric power. On the other hand, when the event has not occurred, the upper limit value of the discharging power is made lower, so that the deterioration of the battery can be suppressed.

In addition, the controller may generate a command so that the upper limit value of the charging power of the battery is made larger when the predetermined event has occurred than when it has not occurred. This enables rapid charging. On the other hand, when the event has not occurred, the upper limit value of the charging power is made lower, so that the deterioration of the battery can be suppressed.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to a first embodiment. The system 1 is a system in which, when a predetermined event (e.g., a disaster) occurs, a vehicle 10 is dispatched to a position or location where the event has occurred, and electric power is supplied from a battery 18 of the vehicle 10 to a user or users. The vehicle 10 is an example of a moving object. The vehicle 10 may be a vehicle that is capable of autonomous traveling, or a vehicle that is capable of manual traveling by a driver. The vehicle 10 is, for example, an electric vehicle or a hybrid vehicle having a function of supplying power to the outside of the vehicle 10.

In the example of FIG. 1, the system 1 includes the vehicle 10 and a server 30. The vehicle 10 and the server 30 are connected to each other by a network N1. The network N1 is, for example, a worldwide public communication network such as the Internet or the like, and a WAN (Wide Area Network) or other communication networks may be adopted. Also, the network N1 may include a telephone communication network such as a mobile phone network or the like, or a wireless communication network such as Wi-Fi (registered trademark) or the like.

Figure 2:
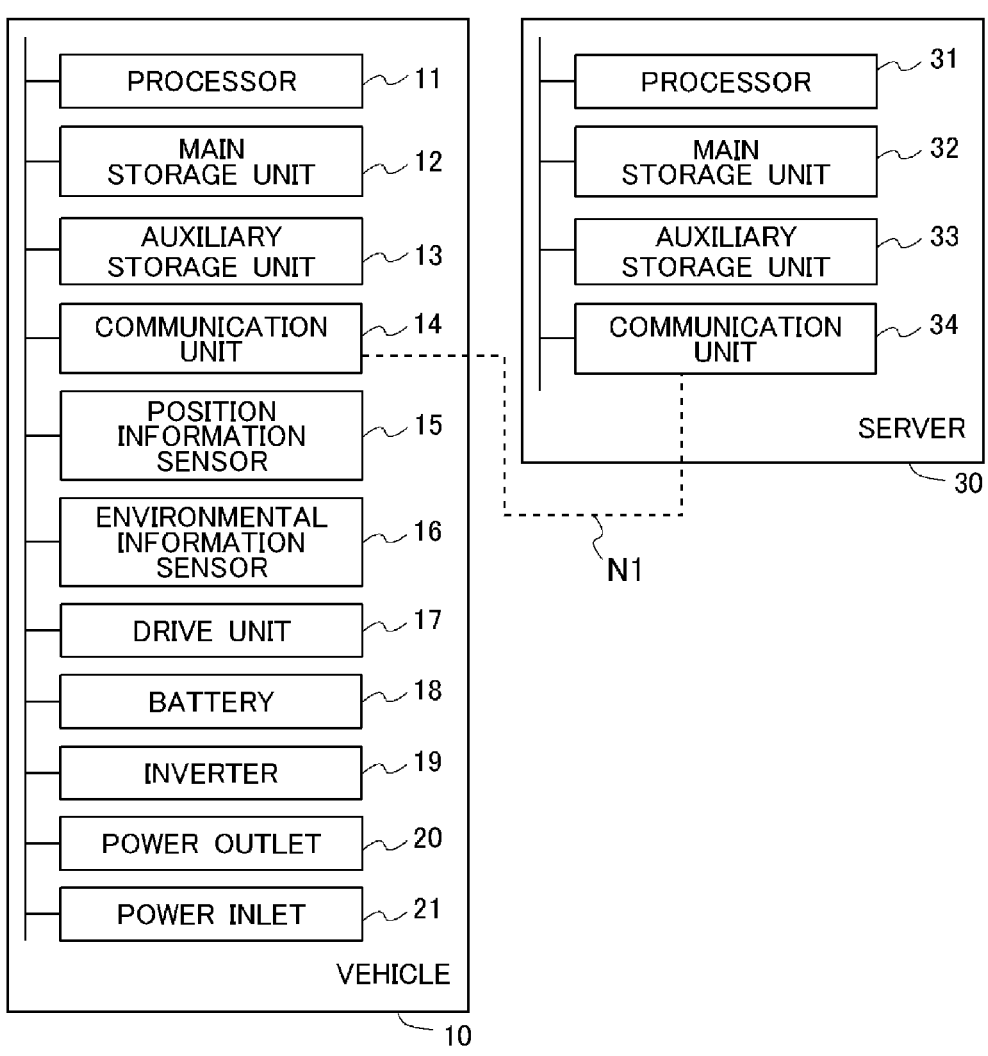
FIG. 2 is a block diagram schematically illustrating an example of a configuration of each of a vehicle and a server, which together constitute the system according to the embodiment.

Hardware configurations and functional configurations of the vehicle 10 and the server 30 will be described based on FIG. 2. FIG. 2 is a block diagram schematically illustrating an example of a configuration of each of the vehicle 10 and the server 30, which together constitute the system 1 according to the present embodiment.

The server 30 has a configuration of a general computer. The server 30 includes a processor 31, a main storage unit 32, an auxiliary storage unit 33, and a communication unit 34. These components are connected to one another by means of a bus. The processor 31 is an example of a controller. Also, the main storage unit 32 and the auxiliary storage unit 33 are examples of a storage unit.

The processor 31 is a CPU (Central Processing Unit), a DSP (Digital Signal Processor), or the like. The processor 31 controls the server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads a program stored in the auxiliary storage unit 33 into a work area of the main storage unit 32 and executes the program, so that each component or the like is controlled through the execution of the program. As a result, the server 30 realizes functions that match predetermined purposes. The main storage unit 32 and the auxiliary storage unit 33 are computer readable recording media. Here, note that the server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the vehicle 10 via the network N1. The communication unit 34 is, for example, a LAN (Local Area Network) interface board, a wireless communication circuit for wireless communication, or the like. The LAN interface board or the wireless communication circuit is connected to the network N1.

Next, the vehicle 10 is, for example, a moving object that is capable of autonomously traveling, and has a computer. The vehicle 10 includes a processor 11, a main storage unit 12, an auxiliary storage unit 13, a communication unit 14, a position information sensor 15, an environmental information sensor 16, a drive unit 17, a battery 18, an inverter 19, a power outlet 20, and a power inlet 21. These components are connected to one another by means of a bus. The processor 11, the main storage unit 12, and the auxiliary storage unit 13 are the same as the processor 31, the main storage unit 32, and the auxiliary storage unit 33 of the server 30, respectively, and hence, the description thereof will be omitted.

The communication unit 14 is a communication means or unit for connecting the vehicle 10 to the network N1. The communication unit 14 is, for example, a circuit for communicating with other devices (e.g., the server 30 and the like) via the network N1 by making use of a mobile communication service (e.g., a telephone communication network such as 5G (5th Generation), 4G (4th Generation), 3G (3rd Generation), LTE (Long Term Evolution) or the like), or a wireless communication such as Wi-Fi (registered trademark), Bluetooth (registered trademark) or the like.

The position information sensor 15 obtains position information (e.g., latitude and longitude) of the vehicle 10 at a predetermined cycle. The position information sensor 15 is, for example, a GPS (Global Positioning System) receiver unit, a wireless communication unit or the like. The information obtained by the position information sensor 15 is recorded, for example, in the auxiliary storage unit 13 or the like and transmitted to the server 30.

The environmental information sensor 16 is a means or unit for sensing the state of the vehicle 10 or sensing the area around the vehicle 10. As a sensor for sensing the state of the vehicle 10, there is mentioned a gyro sensor, an acceleration sensor, an azimuth sensor, or the like. Also, as a sensor for sensing the area around the vehicle 10, there is mentioned a stereo camera, a laser scanner, a LIDAR, a radar, or the like.

The drive unit 17 is a device for driving the vehicle 10 based on a control command generated by the processor 11. The drive unit 17 is configured to include, for example, a plurality of motors or the like for driving rotors provided on the vehicle 10, so that the plurality of motors or the like are driven according to the control command to realize autonomous driving of the vehicle 10.

The battery 18 is a power storage device that can be charged and discharged. The battery 18 can supply electric power to external devices, and can also supply electric power to devices of the vehicle 10. The inverter 19 performs conversion between direct current and alternating current as well as adjustment of current or voltage. The power outlet 20 is a unit for supplying electric power to the outside of the vehicle 10. Electric power can be supplied from the vehicle 10 by inserting a plug into the power outlet 20. The power inlet 21 is a unit for receiving supply of electric power from the outside of the vehicle 10. The battery 18 is charged by this electric power. When the vehicle 10 is a plug-in hybrid vehicle, the power inlet 21 may include a plug for charging the battery 18. The exchange of electric power between the power outlet and inlet 20, 21 and the battery 18 is performed through the inverter 19.

Figure 3:
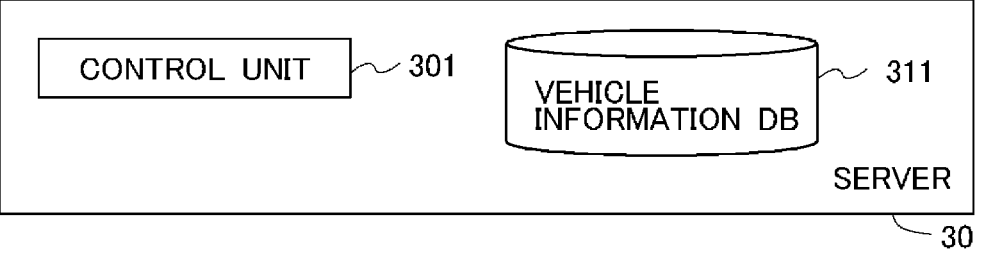
FIG. 3 is a diagram illustrating an example of a functional configuration of the server.

Now, the functions of the server 30 will be described. FIG. 3 is a diagram illustrating an example of a functional configuration of the server 30. The server 30 includes, as its functional components, a control unit 301 and a vehicle information DB 311. The processor 31 of the server 30 executes the processing of the control unit 301 by a computer program on the main storage unit 32. However, any of the individual functional components or a part of the processing thereof may be implemented by a hardware circuit.

The vehicle information DB 311 is built by a program of a database management system (DBMS) that is executed by the processor 31 to manage data stored in the auxiliary storage unit 33. The vehicle information DB 311 is, for example, a relational database.

Here, note that any of the individual functional components of the server 30 or a part of the processing thereof may be executed by another or other computers connected to the network N1.

The control unit 301 generates an operation command for the vehicle 10 when an event has occurred (e.g., when disaster information has been received, or when power failure information has been received, or when evacuation information has been received, or when tsunami hazard information has been received, or when information indicating that a performance or a festival is held outdoors has been received, or the like). Here, note that the information notifying the occurrence of an event is transmitted from a server of a government agency, a local government, an electric power company, an organizer of the event, or the like. The information notifying the occurrence of an event includes information about the position or location where the event has occurred and information about the type of the event. In addition, the operation command includes a command to move to a position where the event has occurred, a command to supply the electric power of the battery 18 at the position where the event has occurred, and a command to change the upper limit values of discharging power (kW) and charging power (kW). The server 30 may generate a route for moving the vehicle 10 to the position where the event has occurred. In order to generate this route, map information may have been stored in the auxiliary storage unit 33.

Here, note that the upper limit value of the discharging power and the upper limit value of the charging power are changed so that the upper limit value of the discharging power and the upper limit value of the charging power are larger when the event has occurred than when it has not occurred. Alternatively, only one of the upper limit value of the discharging power and the upper limit value of the charging power may be changed. For example, when the upper limit value of the charging power is increased, the time required to charge the battery 18 can be shortened. Therefore, when charging and discharging are repeated, it becomes possible to supply electric power immediately. On the other hand, when the upper limit value of the discharging power is increased, it becomes possible to supply electric power to more devices at once. For example, when the event has not occurred, 30 smartphones can be fully charged per hour, but when the event has occurred, 40 smartphones can be fully charged per hour. The upper limit value of the charging power and the upper limit value of the discharging power when the event has occurred, as well as the upper limit value of the charging power and the upper limit value of the discharging power when the event has not occurred, have been stored in advance in the auxiliary storage unit 33.

The period of time in which the upper limit value of the charging power and the upper limit value of the discharging power are made larger may be, for example, a period of time from the time when the vehicle 10 receives an operation command corresponding or responding to an event transmitted from the server 30 to the vehicle 10 until the time when the vehicle 10 receives an operation command for ending the response to the event. As a result, in the vehicle 10, the upper limit value of the charging power and the upper limit value of the discharging power are made larger during a period of time from the time when the operation command corresponding to the event is received until the time when the operation command for ending the response to the event is received. Also, as an alternative, for example, the upper limit value of the charging power and the upper limit value of the discharging power may be made larger during a period of time from the time when the vehicle 10 arrives at the position where the event has occurred until the time when the event ends.

Next, the configuration of vehicle information stored in the vehicle information DB 311 will be described based on FIG. 4. FIG. 4 is a view illustrating an example of a table configuration of the vehicle information DB 311. The vehicle information table includes fields of vehicle ID, current location, event type, and event position or location. In the vehicle ID field, information that can identify each vehicle (vehicle ID) is entered. A vehicle ID is assigned to each vehicle, for example, by the control unit 301. In the current location field, information about the current position or location of each vehicle 10 (position information) is entered. The current location of each vehicle 10 is detected by the position information sensor 15 of the vehicle 10, and transmitted to the server 30.

In the event type field, information about the type of event is entered. The type of event is included in the event information. The event information is information that is transmitted from an external server, for example, and includes information about the occurrence of an event or information requesting dispatch of the vehicle 10 due to the occurrence of an event. In the event position field, information about a position or location where an event has occurred or information about a position or location corresponding to an event is entered. The information about the position corresponding to an event is, for example, information about a destination (e.g., an address, coordinates, or a mesh code) at the time when the vehicle 10 moves in association with the event. The event position is included in the event information, for example.

Figure 5:
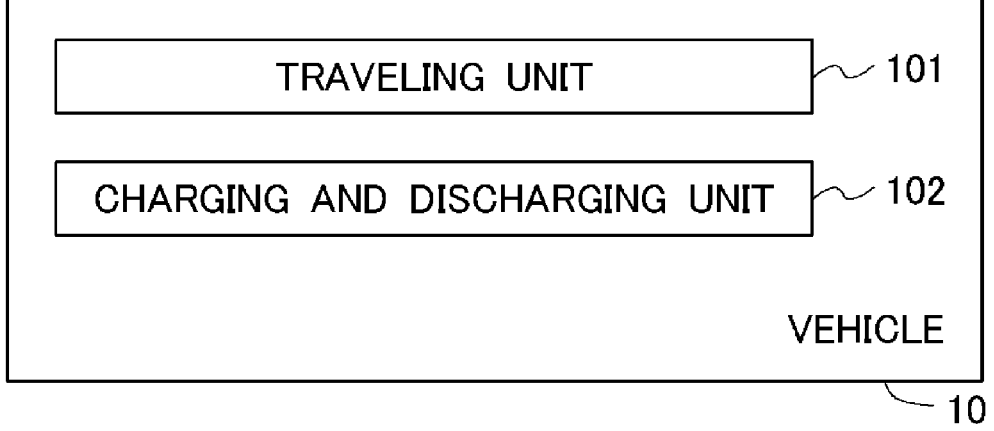
FIG. 5 is a diagram illustrating a functional configuration of the vehicle.

Now, the functions of the vehicle 10 will be described. FIG. 5 is a view illustrating a functional configuration of the vehicle 10. The vehicle 10 includes, as its functional components, a traveling unit 101 and a charging and discharging unit 102. The processor 11 of the vehicle 10 performs the processing of the traveling unit 101 and the charging and discharging unit 102 by executing a computer program on the main storage unit 12. However, any of the individual functional components or a part of the processing thereof may be implemented by a hardware circuit. Here, note that any of the individual functional components of the vehicle 10 or a part of the processing thereof may be executed by another or other computers connected to the network N1.

The traveling unit 101 controls traveling of the vehicle 10 during autonomous traveling of the vehicle 10. The control unit 101 generates a control command for controlling the drive unit 17 by using the data detected by the environmental information sensor 16. The traveling unit 101 controls, for example, the speed, the steering angle, and the like of the vehicle 10 by controlling a plurality of motors to generate a difference in the rotational speed of a plurality of rotors.

For example, the traveling unit 101 generates a travel trajectory of the vehicle 10 based on the data detected by the environmental information sensor 16, and controls the drive unit 17 so that the vehicle 10 travels along the travel trajectory. Here, note that as a method of causing the vehicle 10 to travel in an autonomous manner, there can be adopted a known method. The traveling unit 101 may perform feedback control based on the detection value of the environmental information sensor 16 during autonomous traveling. The traveling unit 101 controls the drive unit 17 so that the vehicle 10 autonomously travels around a predetermined route. This route is included in the operation command transmitted from the server 30.

For example, the traveling unit 101 causes the vehicle 10 to travel based on the travel route and the destination included in the operation command received from the server 30. When an event has occurred, the position or location where the event has occurred becomes the destination. Then, the vehicle 10 is stopped in order to supply electric power to the external devices at the position where the event has occurred.

The charging and discharging unit 102 performs charge control and discharge control of the battery 18. That is, the charging and discharging unit 102 controls the driving of the drive unit 17 by the electric power stored in the battery 18, the recovery of electric power by regenerative braking, and the like. In addition, the charging and discharging unit 102 performs control to charge the battery 18 by receiving the supply of electric power from an external commercial power supply. Further, the charging and discharging unit 102 performs control to supply the electric power stored in the battery 18 to the external devices.

In the charge control in which the battery 18 is charged, the charging and discharging unit 102 controls the inverter 19 such that the electric power input from the power inlet 21 to the battery 18 is equal to or less than the upper limit value of the charging power. On the other hand, in the discharge control in which electric power is supplied from the battery 18, the charging and discharging unit 102 controls the inverter 19 such that the electric power output from the battery 18 to the power outlet 20 is equal to or less than the upper limit value of the discharging power. The upper limit value of the charging power and the upper limit value of the discharging power have been stored in advance in the auxiliary storage unit 13. The upper limit value of the charging power and the upper limit value of the discharging power may be instructed from the server 30.

In addition, the charging and discharging unit 102 sets the upper limit value of the charging power and the upper limit value of the discharging power to be larger when an event has occurred than when it has not occurred. Note that the term "when an event has occurred" includes the case where charging and discharging are performed in association with the occurrence of the event. The upper limit value of the charging power and the upper limit value of the discharging power upon the occurrence of an event may have been stored in advance in the auxiliary storage unit 13, or may be included in the operation command from the server 30. Moreover, the upper limit value of the charging power and the upper limit value of the discharging power may be changed according to the type of event. For example, the upper limit value of the charging power and the upper limit value of the discharging power may be increased for events in which more users want to be supplied with electric power. Note that, in the present embodiment, when an event has occurred, the upper limit values of both the charging power and the discharging power are changed, but as an alternative, the upper limit value of either one of the charging power and the discharging power may be changed.

Further, when the event has ended, the charging and discharging unit 102 returns the upper limit value of the charging power and the upper limit value of the discharging power to the original values thereof before the occurrence of the event. The term "when the event has ended" includes the case where there is no longer a need to perform the charging and discharging associated with the occurrence of the event. When the event has ended, a new operation command is received from the server 30.

When the amount of electricity stored in the battery 18 becomes equal to or less than a threshold value, the traveling unit 101 performs operation control so as to move the vehicle 10 to a position or location where the battery 18 can be charged. When the vehicle 10 arrives at the chargeable position, the charging and discharging unit 102 performs charge control of the battery 18. In this case, charging may be carried out at a position or location far from the position or location where the event occurred, but in cases where charging is carried out in response to the event that occurred, the upper limit value of the charging power is made larger than that when the event has not occurred. As a result, rapid charging becomes possible, so that electric power can be supplied to the outside more quickly.

Figure 6:
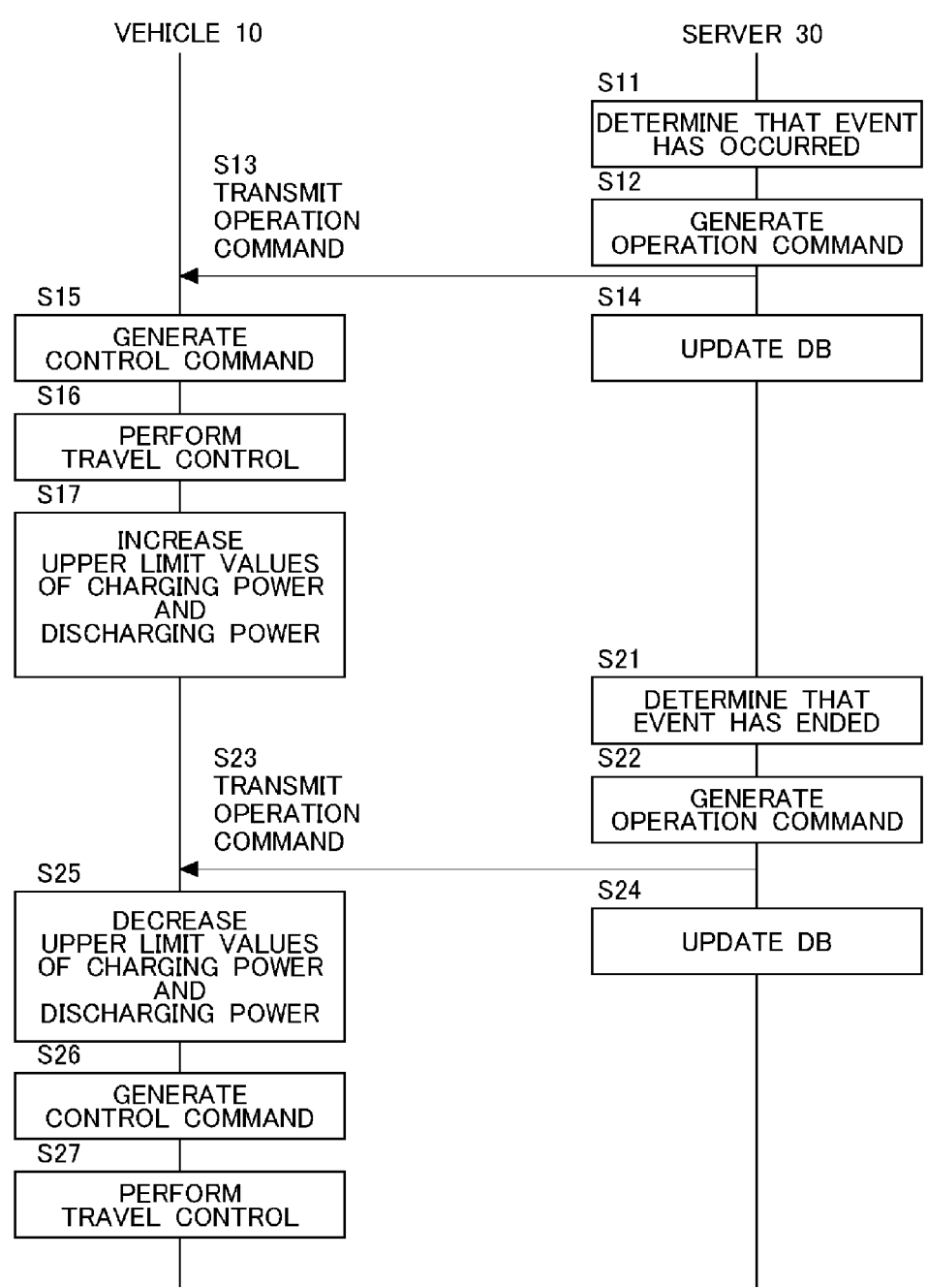
FIG. 6 is a sequence diagram of processing of the system.

Now, the processing of the system 1 as a whole will be described. FIG. 6 is a sequence diagram of the processing of the system 1. When determining that an event has occurred (S11), the server 30 generates an operation command for the vehicle 10 (S12). This operation command is generated for example as follows: the vehicle 10 travels to a predetermined area where an event has occurred; the electric power of the battery 18 is provided to external devices at an arrival point; and when the amount of electricity stored in the battery 18 becomes equal to or less than the threshold value, the vehicle 10 is moved to a chargeable position where the battery 18 can be charged. The operation command may include information about the travel route. In addition, the operation command may include information about the coordinates of the destination. After generating the operation command, the sever 30 transmits the operation command to the vehicle 10 (S13). Further, the sever 30 updates the vehicle information DB 311 in response to the operation command thus transmitted (S14).

The vehicle 10, which has received the operation command, generates a control command for controlling the drive unit 17 based on the operation command (S15). Then, the vehicle 10 performs travel control in accordance with the control command (S16), and autonomously moves to the destination. When arriving at the destination, the vehicle 10 sets the upper limit value of the charging power and the upper limit value of the discharging power to be larger than those in the case where the event has not occurred (S17). The upper limit value of the charging power and the upper limit value of the discharging power at this time may be included in the operation command of the server 30, or may have been stored in advance in the auxiliary storage unit 13 of the vehicle 10. Here, note that, as an alternative, when the travel control is started in S16, the upper limit value of the charging power and the upper limit value of the discharging power may be set to be larger than those in the case where the event has not occurred.

When determining that the event has ended (S21), the sever 30 generates an operation command for the vehicle 10 (S22). This operation command includes, for example, a command for the vehicle 10 to travel to the next predetermined area, a command for the vehicle 10 to travel or patrol in a predetermined region, or a command for the vehicle 10 to return to a base station. In addition, this command includes, for example, a command to return the upper limit value of the charging power and the upper limit value of the discharging power to the original values before the event occurred. As an alternative, it may include a command to set the upper limit value of the charging power and the upper limit value of the discharging power according to a predetermined parameter (e.g., the temperature of the battery 18). After generating the operation command, the sever 30 transmits the operation command to the vehicle 10 (S23). Also, the sever 30 updates the vehicle information DB 311 according to the operation command thus transmitted (S24).

The vehicle 10, which has received the operation command, changes the upper limit value of the charging power and the upper limit value of the discharging power to values included in the operation command (S25). Note that, as an alternative, the upper limit value of the charging power and the upper limit value of the discharging power may be set to be smaller than the currently set values. The upper limit value of the charging power and the upper limit value of the discharging power to be set at this time may have been stored in advance in the auxiliary storage 13. Thereafter, the vehicle 10 generates a control command for controlling the drive unit 17 based on the operation command (S26). Here, note that in the example illustrated in FIG. 6, the vehicle 10 starts the travel control after the operation command is transmitted from the server 30 to the vehicle 10, but instead of this, the vehicle 10 may start autonomous traveling when the traveling unit 101 of the vehicle 10 determines that the event has ended (e.g., when information about the end of the event is received, or when there is no demand for electric power for a predetermined period of time, or when a predetermined period of time has elapsed, or when information to return to the base station is input to the vehicle 10, or the like). In other words, the vehicle 10 may start the travel control without any instruction from the server 30.

Then, the vehicle 10 performs the travel control in accordance with the control command (S27), and autonomously moves to the destination.

Figure 7:
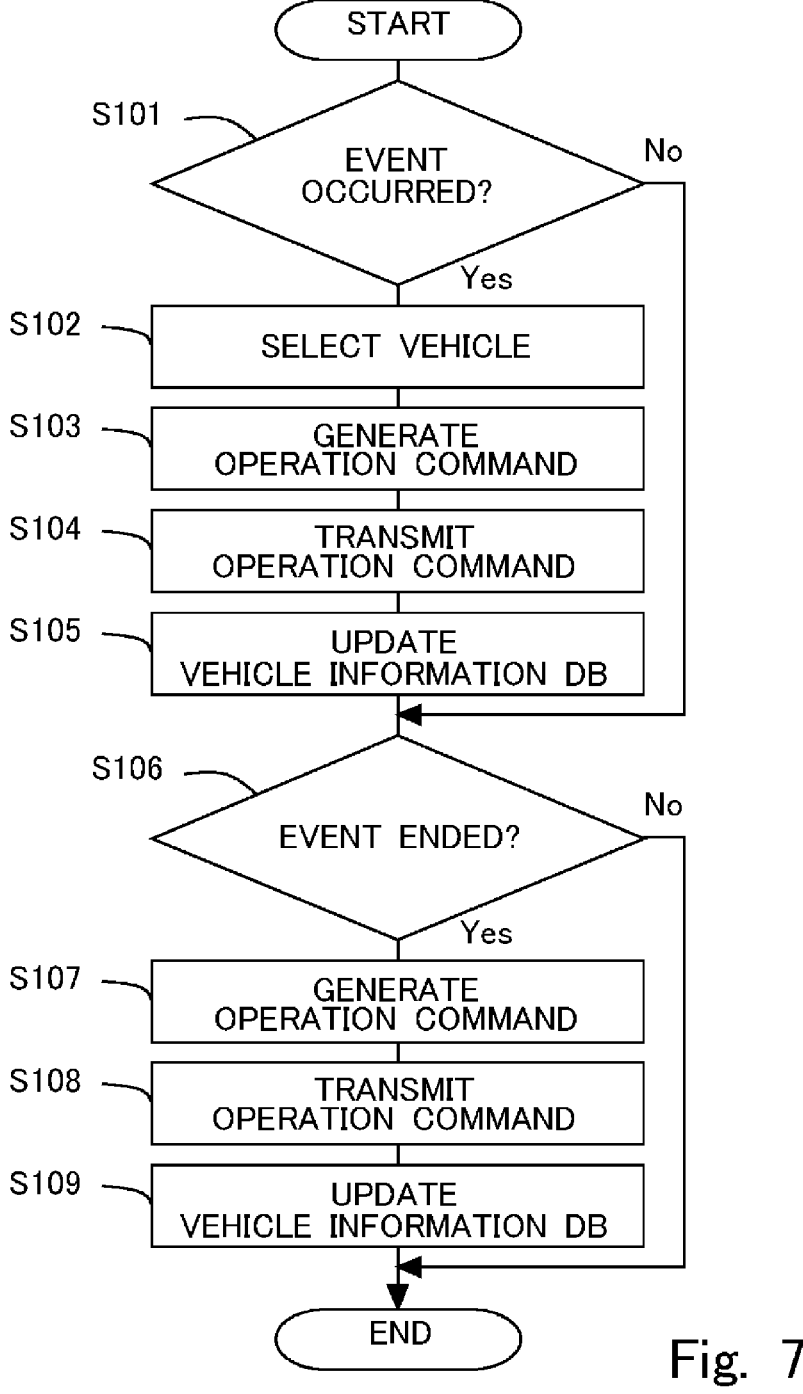
FIG. 7 is a flowchart of command generation processing according to the embodiment.

Next, command generation processing in the server 30 will be described. FIG. 7 is a flowchart of the command generation processing according to the present embodiment. The command generation processing illustrated in FIG. 7 is executed at predetermined time intervals in the server 30.

In step S101, the control unit 301 determines whether or not an event has occurred. The control unit 301 may determine whether or not an event has occurred, for example, by determining whether or not event information has been received. The event information is information about the occurrence of an event or information about a request for the dispatch of the vehicle 10 due to the occurrence of an event. The control unit 301 receives the event information from an external server. The external server is, for example, a server that distributes disaster information, a server that distributes information about outdoor performances, a server that distributes power outage information, a server that distributes evacuation information, a server that distributes tsunami hazard information, or the like. When receiving information about a disaster, for example, the control unit 301 determines that an event has occurred. In addition, the event information includes information about a position where the event has occurred, and the control unit 301 stores in the auxiliary storage unit 33 the information about the position where the event has occurred. When an affirmative determination is made in step S101, the processing proceeds to step S102, whereas when a negative determination is made, the processing proceeds to step S106.

In step S102, the control unit 301 selects a vehicle 10. At this time, the control unit 301 selects a vehicle 10 based on, for example, the position information of the vehicle 10, the amount of electricity stored in the battery thereof, the scale of the event, and the like. Note that the control unit 301 may select a plurality of vehicles 10 as necessary. For example, the larger the scale of the disaster or the larger the number of people to evacuate, the more vehicles 10 may be selected. For example, the control unit 301 may select, based on the position information of each vehicle 10, a vehicle 10 that is located within a predetermined range from the position where the event has occurred, or a vehicle 10 that is closest to the position where the event has occurred. In addition, the control unit 301 may select vehicles in which the amount of electricity stored in each of their batteries 18 is equal to or greater than a predetermined value. The predetermined value referred to here is an amount of electricity stored that allows a vehicle 10 to move to the position where the event has occurred and to provide electric power at that position.

In step S103, the control unit 301 generates an operation command. The operation command is generated so as to allow the vehicle 10 to travel to the position where the event has occurred as a destination and to supply electric power at the destination. In addition, the operation command is generated such that, when the amount of electricity stored in the battery 18 becomes equal to or less than the threshold value, the vehicle 10 is caused to move to, for example, the base station for charging and to perform charging, and to return to the position or location where the event has occurred after charging is completed. Further, the control unit 301 generates the operation command so as to perform discharging and charging by setting the upper limit value of the charging power and the upper limit value of the discharging power to be larger than those in the case where the event has not occurred. In this case, the upper limit value of the electric power is increased in the case of charging and discharging associated with the occurrence of the event. Therefore, for example, even if the vehicle 10 moves away from the area where the event has occurred in order to charge the battery 18, the upper limit values of electric power at the time of traveling of the vehicle 10 and at the time of charging of the battery 18 are made larger than those in the case where the event has not occurred. The upper limit value of the charging power and the upper limit value of the discharging power have been stored in advance in the auxiliary storage unit 33. The operation command may include information about a route, information about the upper limit value of the charging power, and information about the upper limit value of the discharging power. Moreover, the operation command may include information about a position where the vehicle 10 performs charging and information about a route along which the vehicle 10 moves to the position where charging is performed. In order to generate the route, map information may have been stored in the auxiliary storage unit 33 of the server 30.

In step S104, the control unit 301 transmits the operation command to the vehicle 10. This vehicle 10 is the vehicle 10 selected in step S102. Here, note that, as an alternative, a command to cause the vehicle 10 to move toward the position where the event has occurred may be generated and transmitted, and, after the vehicle 10 has moved in accordance with the command, a command to increase the upper limit value of the charging power and the upper limit value of the discharging power may be generated and transmitted to the vehicle 10. In step S105, the control unit 301 updates the vehicle information DB 311. The control unit 301 updates each of the fields of the event type and the event position in the record of the corresponding vehicle 10.

In addition, in step S106, the control unit 301 determines whether or not the event has ended. The control unit 301 determines whether or not the event has ended, for example, by determining whether or not event end information has been received. The event end information is information about the end of the event or information about a request for the return of the vehicle 10 dispatched due to the occurrence of the event. The control unit 301 receives the event end information from an external server. Note that, as an alternative, the event may be considered to have ended when a predetermined period of time has elapsed since the dispatch of the vehicle 10. When an affirmative determination is made in step S106, the processing or routine proceeds to step S107, whereas when a negative determination is made, this routine is ended.

In step S107, the control unit 301 generates an operation command. The operation command is generated so as to cause the vehicle 10 to travel to the base station as a destination, for example. Further, the control unit 301 generates the operation command so as to return the upper limit value of the charging power and the upper limit value of the discharging power to those before the occurrence of the event. The operation command may include information about a route, information about the upper limit value of the charging power, and information about the upper limit value of the discharging power.

In step S108, the control unit 301 transmits the operation command to the vehicle 10. This vehicle 10 is the vehicle 10 that has been dispatched to the event that has ended. Information about a vehicle 10 dispatched to each event has been stored in the vehicle information DB 311. In step S109, the control unit 301 updates the vehicle information DB 311. The control unit 301 updates each of the fields of the event type and the event position in the record of the corresponding vehicle 10 by leaving them blank.

Figure 8:
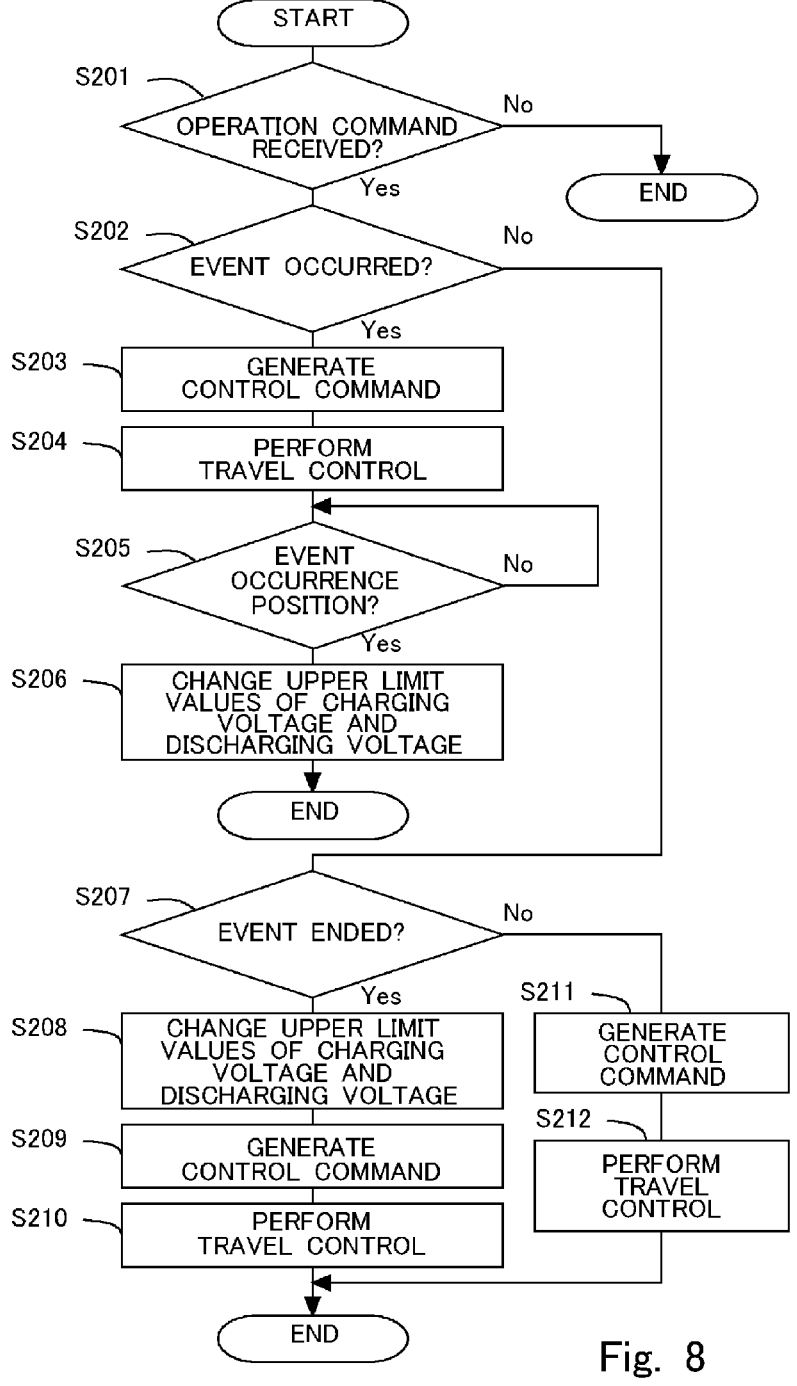
FIG. 8 is a flowchart of processing in the vehicle according to the embodiment.

Then, the processing in the vehicle 10 will be described. FIG. 8 is a flowchart of the processing in the vehicle 10 according to the present embodiment. The processing illustrated in FIG. 8 is executed at predetermined time intervals in the vehicle 10.

In step S201, the traveling unit 101 determines whether or not an operation command has been received from the server 30. When an affirmative determination is made in step S201, the processing or routine proceeds to step S202, whereas when a negative determination is made, this routine is ended. In step S202, the traveling unit 101 determines whether or not the operation command received is an operation command responding to the occurrence of an event. For example, whether or not the operation command received is an operation command responding to the occurrence of an event may be determined from information included in the operation command. Alternatively, the traveling unit 101 may determine whether or not a command to increase the upper limit values of the charging voltage and the discharging voltage is included. When an affirmative determination is made in step S202, the processing proceeds to step S203, whereas when a negative determination is made, the processing proceeds to step S207.

In step S203, the traveling unit 101 generates a control command according to the operation command. For example, the control command is generated so that the vehicle 10 departs from the base station and heads for a predetermined point in the area where the event has occurred. The predetermined point is indicated by the server 30 as a point at which the battery 18 of the vehicle 10 is charged or discharged. Note that the control command may be generated by using a known technique. In step S204, the traveling unit 101 controls the drive unit 17 in accordance with the control command, thereby performing travel control. By this travel control, the vehicle 10 travels to the predetermined point in the area where the event has occurred.

In step S205, the traveling unit 101 determines whether or not the vehicle 10 have arrived at the predetermined point in the area where the event has occurred. For example, the traveling unit 101 compares the position information obtained by the position information sensor 15 with the information about the predetermined point obtained from the server 30, and determines whether or not the vehicle 10 has arrived at the predetermined point. When an affirmative determination is made in step S205, the processing proceeds to step S206, whereas when a negative determination is made, the processing of step S205 is executed again.

In step S206, the charging and discharging unit 102 controls the inverter 19 thereby to make the upper limit value of the charging power and the upper limit value of the discharging power larger than those in the case where the event has not occurred. In this case, the upper limit value of the charging power and the upper limit value of the discharging power may be set to values included in the operation command received from the server 30. Here, note that, as an alternative, before the travel control in step S204 is started, the upper limit value of the charging power and the upper limit value of the discharging power may be set to be larger than those in the case where the event has not occurred. Accordingly, for example, it is possible to increase the regenerative electric power obtained during deceleration of the vehicle 10. When the processing of step S206 is completed, this routine is ended.

In step S207, the charging and discharging unit 102 determines whether or not the event has ended. For example, when event end information is received from the server 30, the charging and discharging unit 102 determines that the event has ended. The event end information is included in the operation command. As an alternative, the charging and discharging unit 102 may determine that the event has ended, when a predetermined period of time has elapsed since the completion of the processing of step S206. When an affirmative determination is made in step S207, the processing proceeds to step S208, whereas when a negative determination is made, the processing proceeds to step S211.

In step S208, the charging and discharging unit 102 returns the upper limit value of the charging power and the upper limit value of the discharging power to the values before being changed in step S206. As an alternative, the charging and discharging unit 102 may set the upper limit value of the charging power and the upper limit value of the discharging power to values included in the operation command received from the server 30. Even in this case, the upper limit value of the charging power and the upper limit value of the discharging power will still be made smaller than at present.

In step S209, the traveling unit 101 generates a control command according to the operation command. The control command is generated so that the vehicle 10 returns to the base station, for example. As an alternative, in cases where the operation command includes a command to move the vehicle 10 to the position where the next event has occurred, the control command is generated to move the vehicle 10 to that position. In step S210, the traveling unit 101 controls the drive unit 17 in accordance with the control command, thereby performing travel control.

On the other hand, in step S211, the traveling unit 101 generates a control command according to the operation command. The control command at this time is an operation command that is not associated with the occurrence of an event, and is generated such that the vehicle 10 travels toward a predetermined point or travels on a predetermined patrol route. Then, in step S210, the traveling unit 101 controls the drive unit 17 in accordance with the control command, thereby performing travel control.

As described above, according to the present embodiment, electric power can be supplied from the battery 18 to external devices at a position or location where an event has occurred, by using the vehicle 10 that can move autonomously. At this time, the upper limit value of the discharging voltage can be increased, so that electric power can be supplied to more devices. In addition, the upper limit value of the charging voltage can be increased, so that the battery 18 can be charged more quickly, thus making it possible to supply electric power to other devices more quickly. Moreover, when an event has not occurred, the upper limit value of the discharging power and the upper limit value of the charging power are decreased, thereby making it possible to suppress the deterioration of the battery 18. In this manner, since the upper limit values of the electric power at the time of charging and discharging are changed as necessary, it is possible to more appropriately utilize the battery 18, while suppressing the deterioration of the battery.

Other Embodiments

The above-described embodiment is merely an example, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the server 30 may include a part of the functions of the vehicle 10. Also, for example, the vehicle 10 may include a part or all of the functions of the server 30. That is, the vehicle 10 may autonomously travel by receiving event information from an external server.

The present disclosure can also be realized by supplying to a computer a computer program in which the functions described in the above-described embodiment are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus including a controller configured to perform:
   when a predetermined event has occurred, generating a command to move a moving object to a position corresponding to the predetermined event, the predetermined event being an event in which power supply from a battery mounted on the moving object increases; and
   generating a command to make an upper limit value of discharging power and an upper limit value of charging power of the battery larger when the predetermined event has occurred and on condition that the moving object has arrived at the position corresponding to the predetermined event than when the predetermined event has not occurred.

2. The information processing apparatus according to claim 1, wherein
   the controller determines that the predetermined event has occurred, in the case where information about a disaster is obtained.

3. The information processing apparatus according to claim 1, further including:
   a storage unit configured to store information about a position corresponding to the predetermined event.

4. The information processing apparatus according to claim 1, further including:
   a storage unit configured to store a relationship between the moving object and the upper limit value of the discharging power of the battery.

5. The information processing apparatus according to claim 4, wherein the storage unit further stores a relationship between the moving object and an upper limit value of charging power of the battery.

6. The information processing apparatus according to claim 1, wherein after the predetermined event has ended, the controller generates a command to return the upper limit value of the discharging power to a value before the occurrence of the predetermined event.

7. An information processing method for causing a computer to perform:

when a predetermined event has occurred, generating a command to move a moving object to a position corresponding to the predetermined event, the predetermined event being an event in which power supply from a battery mounted on the moving object increases; and generating a command to make an upper limit value of discharging power and an upper limit value of charging of the battery larger when the predetermined event has occurred and on condition that the moving object has arrived at the position corresponding to the predetermined event than when the predetermined event has not occurred.

8. The information processing method according to claim 7, wherein the computer determines that the predetermined event has occurred, in the case where information about a disaster is obtained.

9. The information processing method according to claim 7, wherein the computer stores information about a position corresponding to the predetermined event in a storage unit.

10. The information processing method according to claim 7, wherein the computer stores a relationship between the moving object and the upper limit value of the discharging power of the battery in a storage unit.

11. The information processing method according to claim 10, wherein the computer further stores a relationship between the moving object and an upper limit value of charging power of the battery in the storage unit.

12. The information processing method according to claim 7, wherein after the predetermined event has ended, the computer generates a command to return the upper limit value of the discharging power to a value before the occurrence of the predetermined event.

* * * * *